(12) United States Patent
Lee

(10) Patent No.: US 6,983,983 B2
(45) Date of Patent: Jan. 10, 2006

(54) HIGH ROOF STRUCTURE OF A VEHICLE

(75) Inventor: Bum Jae Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/751,048

(22) Filed: Dec. 31, 2003

(65) Prior Publication Data

US 2005/0082880 A1   Apr. 21, 2005

(30) Foreign Application Priority Data

Oct. 17, 2003   (KR) ...................... 10-2003-0072729

(51) Int. Cl.
*B62D 25/06* (2006.01)
(52) U.S. Cl. .................................... 296/201; 296/26.04
(58) Field of Classification Search ................ 296/210, 296/26.01, 26.04

See application file for complete search history.

(56) References Cited

U.S. PATENT DOCUMENTS

| 4,837,914 A | * | 6/1989 | Borum et al. ............... 29/401.1 |
| 5,029,936 A | * | 7/1991 | Gonzalez .................... 296/210 |
| 5,104,177 A | * | 4/1992 | Thomas, Jr. ................ 296/210 |

FOREIGN PATENT DOCUMENTS

| JP | 63-240477 | 10/1988 |
| JP | 1996-038483 | 11/1996 |
| JP | 09-254815 | 9/1997 |
| JP | 11-020736 | 1/1999 |
| JP | 2000-033820 | 2/2000 |

* cited by examiner

*Primary Examiner*—Patricia L. Engle
(74) *Attorney, Agent, or Firm*—Morgan Lewis & Bockius LLP

(57) ABSTRACT

A high roof structure of a vehicle includes a high roof formed from a RFP (Fiber Reinforced Plastics) with good durability, forming properties, and a reinforced structure is integrally installed using a predetermined adhering member and engaging member. No welding is needed. An indoor height of a vehicle is increased to a desired size and a desired indoor floor space index is obtained.

8 Claims, 4 Drawing Sheets

HIGH ROOF STRUCTURE OF A VEHICLE

CROSS-REFERENCE TO RELATED APPLICATIONS

This application claims priority to Korean Application No. 10-2003-0072729, filed Oct. 17, 2003, the disclosure of which is incorporated fully herein by reference.

FIELD OF THE INVENTION

Generally, the present invention relates to a high roof structure of a vehicle. More particularly the roof structure is formed of a RFP (Fiber Reinforced Plastics) with a good durability and integrally installed using a predetermined adhering member and an engaging member without welding.

BACKGROUND OF THE INVENTION

Typically, vehicles are classified into various types based on a proposed use, a driving method, a shape, etc. Recently, there has been an increase in public attention drawn to the use of mini buses, vans, recreation vehicles, etc., as compared to the traditionally favored passenger cars, big sized buses, and vehicles for simple freight purpose.

Many automakers have exerted more efforts towards manufacturing various types of vehicles to meet customers' demands. In particular, many vehicles have been manufactured including appropriate modifications for export such that the vehicle meets various related regulations and tax systems of the importing countries.

For example, in the case of a 1-ton mini bus, the preference of the high roof vehicle has been increased in the EU and Middle America regions. In a one country, for example, in the case of a van, when an indoor floor space index of the interior of a freight compartment meets a certain regulation, a certain tax advantage is provided to the owner of a van. In a certain country, the floor space index is regulated by the sate law.

Therefore, under the above conditions, a method for expanding a sufficient indoor floor space index is to change a ceiling structure of a vehicle to a high roof structure. In the above vehicle, a certain container-shaped high roof having a certain inner space, not a curved or plane roof panel shape, is adapted.

Namely, a certain container-shaped high roof having a certain inner space is covered on a ceiling part of the vehicle body for thereby increasing the height of a vehicle body, and a sufficient indoor floor space index is obtained.

According to Japanese patent laid-open Nos. 2000-33820, Hei 9-254815, Hei 11-20736, and Sho 63-240477, in order to obtain a desired strength in a high roof structure, a flat steel plate is press-formed and fixed to a vehicle body by spot welding and thereby integrated with a vehicle body. In another method, the steel flat plate is rotation-fixed using a hinge point.

However, when a high roof formed of a steel-pressed flat part is used as in the conventional art, increasing an indoor floor space index of a vehicle is greatly limited due to a limit in a panel formation (it is difficult to form a container-shaped high roof having a desired depth). In addition, it is also difficult to comply with a regulation in certain countries.

Therefore, what is needed is to develop a high roof structure for a vehicle capable of providing a sufficient durability and strength for a ceiling part and achieving a desired indoor height of a vehicle body.

SUMMARY OF THE INVENTION

An embodiment provides a high roof structure of a vehicle. A high roof is formed of a RFP (Fiber Reinforced Plastics) with a good durability, forming property, and a reinforced structure and is integrally installed using a predetermined adhering member and engaging member. The structure preferably does not utilize welding. Therefore, it is possible to achieve a desired indoor height of a vehicle and a desired indoor floor space index is obtained.

There is provided a high roof structure of a vehicle, wherein the high roof structure of a vehicle comprises a high roof formed in a container shape using a FRP (Fiber Reinforced Plastics). The high roof is also provided with a reinforcing structure, wherein the high roof is covered on a cut-away portion of a ceiling portion of a vehicle body. The high roof also includes a flange part bent inwardly from the roof on the entire portions of a front part, a rear part, and a side part of the high roof, wherein the flange part is engaged with each roof rail part of the vehicle body by an adhering member and an engaging member.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1A:
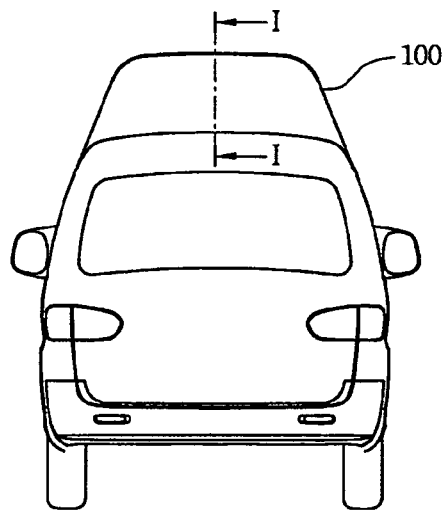
FIGS. 1A and 1B are rear and lateral views illustrating a vehicle with a high roof structure according to an embodiment of the present invention.
Figure 1B:
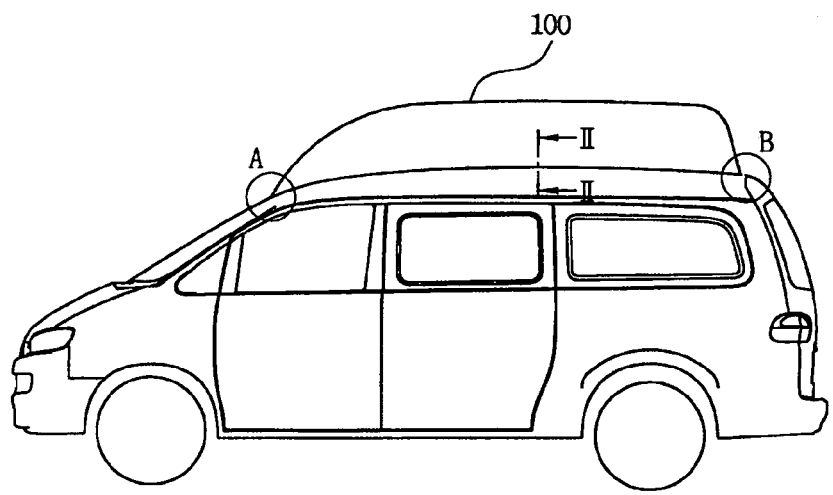

According to FIGS. 1A and 1B the FRP used as a material of a high roof of a vehicle is made of glass fiber and resin. The FRP is known to have an excellent durability and forming property. In the case that the high roof is fabricated using the FRP, it is possible to fabricate a container shaped structure having a desired depth. Since there is virtually no limit for forming the FRP, it is possible to achieve a desired indoor height of a vehicle as compared to the conventional steel high roof. Also a desired indoor floor space index is achieved. When forming a high roof using the FRP, glass fiber and resin are stacked by a certain thickness using a mold and are hardened, thus achieving a desired strength similar to a steel structure.

Figure 2A:
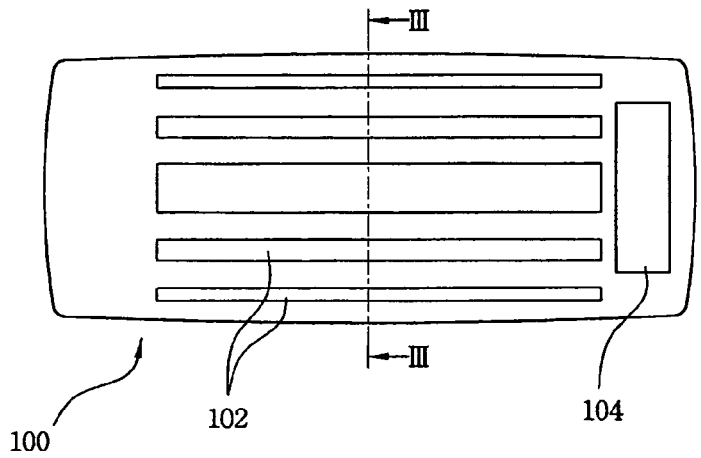
FIG. 2A is a plane view illustrating a high roof in which a reinforced member is installed according to an embodiment of the present invention.
Figure 2B:
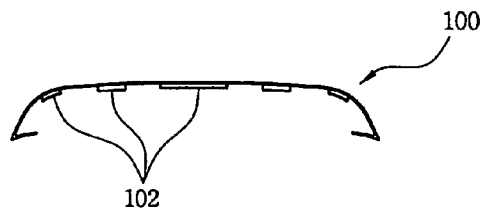
FIG. 2B is a cross sectional view taken along the line III—III of FIG. 2A.

Additionally, as shown in FIGS. 2A and 2B, when fabricating a high roof using the FRP material, a plurality of reinforcing members 102 and 104 are provided on an inner surface of the high roof 100 for enhancing strength with respect to a torsion stress during a running of the vehicle. The above construction will be described below.

FIG. 2A is a plane view illustrating a high roof in which a reinforced member is installed. FIG. 2B is a cross sectional view taken along the line III—III of FIG. 2A. As shown therein, a plurality of reinforcing members 102 and 104, fabricated such that a coated steel plate having a certain thickness is rolled and formed in a channel shape, are inserted to an inner surface of the roof 100 during the formation of a high roof.

The reinforcing members 102 and 104 are longitudinally provided in the vertical and horizontal directions, respectively, of the vehicle. As shown in FIG. 2A, five vertical direction reinforcing members 102 and one horizontal direction reinforcing member 104 are provided. It should be appreciated however, that the total number and arrangement of the reinforcing member may be changed.

It is preferred that the thickness be minimized such that the weight of the reinforcing members 102 and 104 is decreased. Here, the reinforcing members 102 and 104 may be fabricated using a predetermined material having sufficient strength.

Figure 3A:
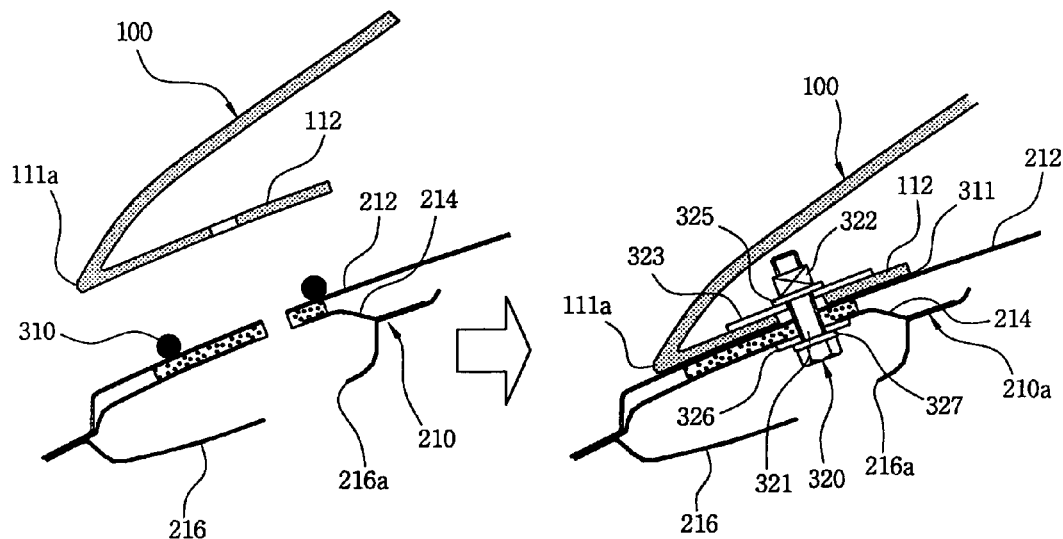
FIGS. 3A and 3B are cross sectional view taken along the line I—I of FIG. 1A and illustrates a high roof engaging structure of a front rail part and a rear rail part according to an embodiment of the present invention.
Figure 3B:
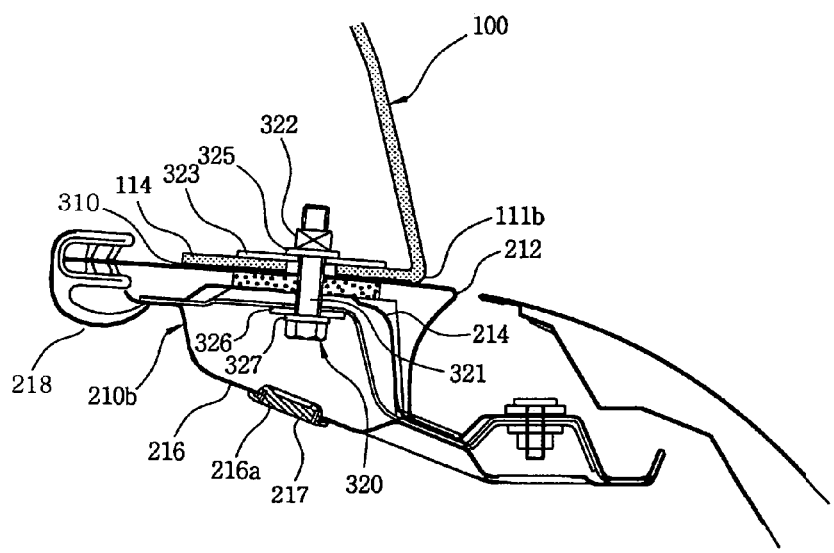
Figure 3C:
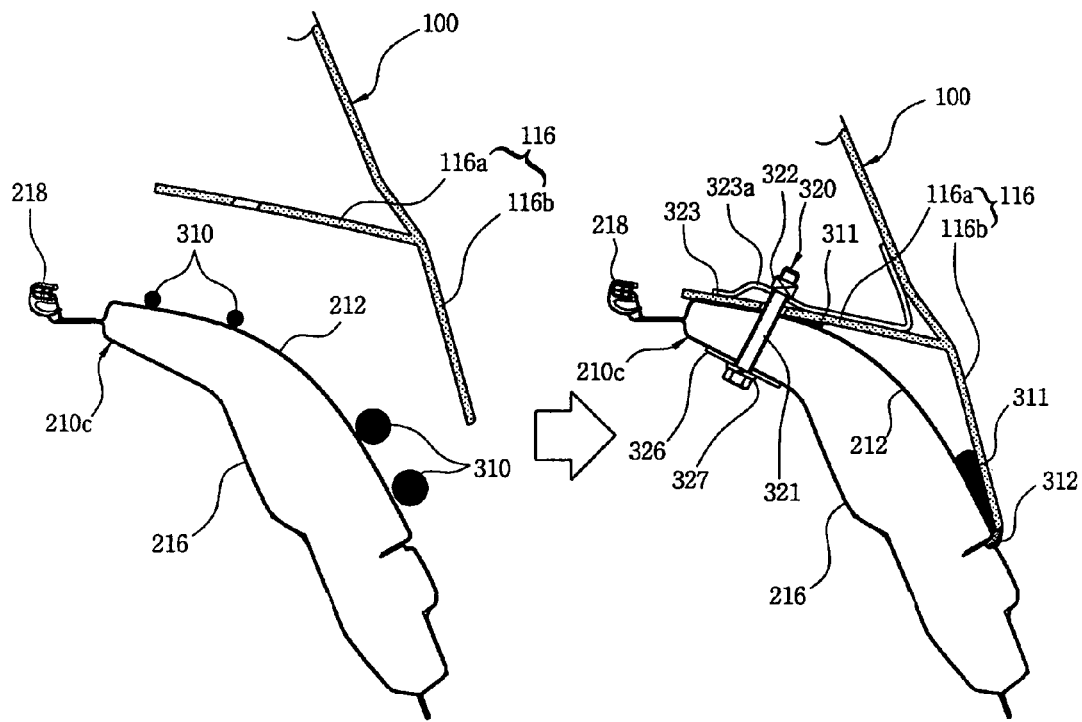
FIG. 3C is a cross sectional view taken along the line II—II of FIG. 1B and illustrates a high roof engaging structure of a side rail part according to an embodiment of the present invention.

The FRP high roof 100 is not welded because of its original physical properties. Therefore, the FRP high roof 100 is covered on a cut-sway portion of the ceiling part of the vehicle body using a predetermined adhering member and an engaging member. FIGS. 3A through 3C are views illustrating a structure of the FRP high roof in an engaged position.

FIGS. 3A and 3B are cross sectional views taken along the line I—I of FIG. 1a and illustrating a high roof engaging structure of a front rail part and a rear rail part. Here, the engaging structure of the front rail part represents an engaging structure of the portion A of FIG. 1B, and the engaging structure of the rear rail part of FIG. 3B represents an engaging structure of the portion B of FIG. 1B.

FIG. 3C is a cross sectional view taken along the line II—II of FIG. 1B and illustrating a high roof engaging structure of the side rail part. When forming a container shaped FRP high roof being covered on the ceiling part of the vehicle body according to the present invention, a flange part corresponding to a conjunction part with a panel of a vehicle body is bent in an inward direction of the roof along the entire surrounding portions. When engaging with the vehicle body, the flange part and the panel of the vehicle body are engaged with each other by an engaging unit and an adhering member.

In FIG. 3a, the flange part 112 is bent in an inward direction of the roof along the entire surrounding portions in the horizontal direction of the vehicle body from the front portion of the high roof 100. The flange part 112 of the high roof 100 and the adhering part 310 of the outer panel 212 of the vehicle body are engaged with each other using an adhering member 310 and an engaging part 320. The bending angle of the flange part 112 is determined based on an inclination of the outer panel 212 of the vehicle body. The inclination of the flange part 112 and the inclination of the outer panel 212 of the vehicle body are matched, so that the conjugating surface of the flange part 112 is fully matched with the conjugating surface of the outer panel 212 of the vehicle body. In addition, an outer curvature of the bent portion 111a in the front portion of the high roof 100 is minimized, such that a gap between the outer end of the bent portion 111a and the outer panel 212 of the vehicle body is minimized.

When engaging the front portion of the high roof 100 to a vehicle body panel, an adhering member 310 is applied to the flange part 112 and the outer panel 212 of the vehicle body. Two conjugating portions are compressed with each other and then engaged using a bolt 321 and a nut 322. The adhering member 310 is used for providing a certain adhering force for sealing and preventing a gap. The adhering member 310, a sikaflex generally used as a sealant for a vehicle is preferably used in the present invention. Here, the sikaflex is made of a polyurethane as a main material and is known to have excellent strength during the hardening and an excellent adhering property and vibration absorption property and noise isolation effect.

In order to enhance an adhering property, a primer is first applied on the entire conjugating surfaces of the outer panel 212 of the vehicle body. Then the sikaflex 310 is applied in two rows on the conjugating surfaces of the outer panel 212 of the vehicle body. When mounting the roof, the flange part 112 is contacted with the outer panel 212 of the vehicle body, so that the sikaflex 310 is uniformly applied into each conjugating surfaces. Thereafter, an engaging force of the bolt 321 and the nut 322 compresses two conjugating surfaces, so that an adhering later 310 is formed with a certain thickness after the hardening process is performed. Therefore, it is possible to absorb vibration, reduction and prevention of noise and water sealing effects during the running to the vehicle by applying the sikaflex between the high roof and the contacting surfaces of the vehicle body.

In an engaging process using an engaging part 320, in a state that a reinforcing plate 323 and a washer 325 are disposed on an upper surface of the flange part 112 in the inner space of the roof 100, the nut 322 is fixed, and the bolt 321 is inserted into the engaging holes (not shown) formed in the roof flange part 112, the vehicle body outer panel 212, and the roof rail 214 from the upper side to the down side and then is engaged with the nut 322. The bolt 321 is engaged by inserting a certain tool into the hole 216a formed in the vehicle body inner panel 216. The hole 216a is installed from the driver's seat and is covered by a head lining (not shown) covering the inner panel 216 in the lower side. In addition, the inner end portions of the front rail part 210a covered by the high roof 100 are covered by the head lining, so that a molding is not installed thereon.

In FIG. 3A, a washer 326 is disposed between the head of the bolt 321 and the roof rail 214 of the vehicle body for obtaining a certain engaging strength of the bolt 321. A spring washer 327 is disposed for preventing the bolt 321 from being loosened due to a decrease in the durability by a movement and torsion strength during the running of the vehicle.

The engaging structure of the bolt 321 and the nut 322 is applied to multiple portions in the horizontal direction of the vehicle body in the front rail part 210a. Since the high roof 100 and the vehicle body front rail part 210a are engaged in the multiple points, the vehicle front rail part 210a is more stably engaged and supported as compared to the front part of the high roof 100.

In FIG. 3B, a flange part 114 is bent in the inward direction of the roof on the entire surrounding portions in the horizontal direction of the vehicle body in the rear part of the high roof 100. As shown therein, an adhering member and an engaging member are adapted to engage the flange part 114 of the high roof 100 and the vehicle body outer panel 212. In the engaging structure of the rear rail part, the engaging structure between the FRP high roof 100 and the vehicle body real rail part 210b is the same as the engaging structure of the front rail part 210a. Namely, in the real rail part 210b, primer is uniformly applied on the entire portions of the conjugating surface of the vehicle body outer panel 212, and the sikaflex 310 is uniformly applied in two rows on the conjugating surface of the vehicle body outer panel 212. Thereafter, the rear part of the roof 100 is mounted on the vehicle rear rail part 210b. The flange part 114 is supported on the vehicle body outer panel 212.

At this time, when the sikaflex 310 is uniformly applied between two conjugating surfaces, in a state that the flange part 114 of the roof and the vehicle body outer panel 212 are conjugated with each other, the bolt 321 and the nut 322 are engaged.

The above engaging structure of the bolt 321 and the nut 322 is applied at multiple points at regular intervals in the horizontal direction of the vehicle body in the real rail part 210.

The bolt 321 is engaged using a certain tool by inserting the same into the hole 216a formed in the vehicle body inner panel 216. In the rear rail part 210b, the hole 216a is fully exposed to the outside. A plug 217 is inserted into the hole for thereby blocking the hole 216a in order to enhance an outer visual appearance.

In addition, the inner end portions of the vehicle body rear rail part 210b corresponding to the cut-away portion for installing the roof are fully exposed to the outside. Since the exposed portions are sharp for thereby causing a certain damage and have a bad outer visual appearance, a weather strip 218 is provided on the entire portions of the inner ends of the rear rail part 210b covered by the high roof 100.

The bending angle of the flange part 114 in the rear part of the roof 100 is determined based on the inclination of the vehicle body outer panel 212. The inclination of the flange part 114 is matched with the inclination of the vehicle body outer panel 212 in the same manner as the front part of the roof, so that the conjugating surface of the flange part 114 is fully matched with the conjugating surface of the vehicle body outer panel 212. In addition, a gap formation between the outer end of the bent portion 111b and the vehicle body outer panel 212 is minimized in such a manner that the curvature of the outer side of the bent portion 111b is minimized in the rear portion of the high roof 100.

In FIG. 3C, a flange part 116 is formed on the entire portions in the vertical direction of the vehicle body in both sides of the high roof 100. As shown therein, the flange part 116 of the high roof 100 and the side outer panel 212 of the roof side rail part 210c are engaged with each other by an adhering member and an engaging member.

In the side part of the roof 100, an inner side flange part 116a and an outer side flange part 116b are formed during the forming process and belong to the flange part 116. The inner side flange part 116a is bent inwardly from the roof 100 and is adhered to the upper surface of the side outer panel 212 and is engaged using the bolt. The outer side flange part 116b is adhered in such a manner that it covers the side outer panel 212 from the outer side.

Here, the conjugating portions of the inner side flange part 116a and the conjugating portions of the side outer panel 212 are fully matched by matching their inclinations. A side outer panel 212 and a gap are formed in the portions except for the conjugating portions of the inner side flange part 116a and the end conjugating portions of the outer side flange part 116b.

When engaging the high roof 100 to the vehicle body panel, an adhering member 310 is applied between the inner side flange part 116a and the side outer panel 212. The inner side flange part 116a and the side outer panel 212 are compressed with each other and are engaged using the bolt 321 and the nut 322. The above engaging structure is the same as the engaging structure of the front and rear rail parts 210a and 210b. Namely, a primer is uniformly applied to the entire portions of the side outer panel 212 conjugated with the inner side flange part 116a for enhancing an adhering property. The sikaflex 310 is coated in two rows on the conjugating surface of the side outer panel 212. The side part of the roof 100 is mounted on the vehicle body side rail part 210c, and the inner side flange part 116a is supported on the upper surface of the side outer panel 212.

At this time, the sikaflex 310 is uniformly applied between two conjugating surfaces. The inner side flange part 116a of the roof 100 and the upper surface of the side outer panel 212 are conjugated with each other and are engaged using the bolt 321 and the nut 322. In order to prevent the outer side flange part 116b from getting loose, the sikaflex 310 is coated and filled in a gap portion between the outer side flange part 116b and the side outer panel 212. When the primer and the sikaflex 310 are coated on the inner side flange part 116a, the primer and the sikaflex 310 are also coated on the outer flange part 116b, so that the roof 100 is mounted.

Finally, the sikaflex 310 of the gap region is spread in the gap region when the roof 100 is mounted. The sikaflex filled and hardened in the gap region is capable of absorbing vibration and preventing noise and water leakage. When engaging the bolt 321 and the nut 322, the nut 322 is engaged in a state that the strength reinforcing plate 323 is disposed on the upper surface of the inner side flange part 116a in the inner space of the roof 100. Thereafter, the bolt 321 is inserted into the inner side flange part 116a, the side outer panel 212, and the side inner panel 216 through the engaging hole (not shown) from the upper side to the lower side and then is engaged with the nut 322.

In the engaging structure of the side rail part, the strength reinforcing plate 323 having a form part 323a is used. The lateral side of the strength reinforcing plate 323 is closely contacted with the inner surface of the roof 100. The form part 323a formed based on the engaging angle of the bolt 321 is provided in the engaging portion of the nut 322 for thereby maintaining a certain angle.

In FIG. 3C, a washer 326 is provided for enhancing an engaging force of the bolt 321 between the head of the bolt 321 and the side inner panel 212, and reference numeral 327 represents a spring washer provided for preventing the bolt 321 from being loosened due to a movement during the running of the vehicle and a decrease in the durability by a torsion strength. The above engaging structure of the bolt 321 and the nut 322 is provided at multiple portions at regular intervals in a horizontal direction of the vehicle body in the rear rail part 210c.

The end portion of the side rail part 210c corresponding to the cut-away portion formed to install the roof 100 is exposed in the indoor. The exposed portions have a bad outer visual appearance and may damage a passenger or freight by its sharp portion. Therefore, a weather strip 218 is provided on the entire surrounding portions on the inner end portion of the side rail part 210c covered by the high roof 100. In the case that the weather strip 218 is installed at the end portion of the side rail part 210c, it is possible to cover the side outer panel 212 and the side inner panel 216. A sealant 312 is coated on the entire surrounding portions of the side part between the lower end of the roof outer side flange part 116b and the side outer panel 212 wherein the roof outer side flange part 116b covers the side outer panel 212 in a state that the bolt 321 and the nut 322 are engaged.

Figure 4:
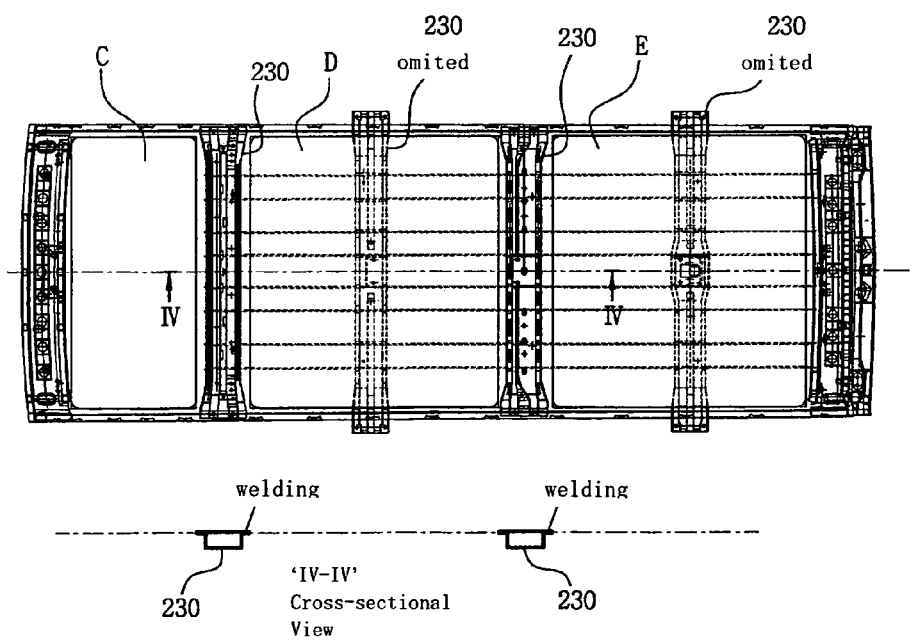
FIG. 4 is a plane view illustrating a cut-away part of a vehicle body ceiling part to which a high roof is engaged according to an embodiment of the present invention.

Next, FIG. 4 is a plane view illustrating the cut-away portion of the vehicle body ceiling portion to which the high roof is engaged. In the case that the high roof 100 is engaged, a region C in the side of the driver's seat, a region (D/E in the case of 3-van) in the rear side or two regions (E in the case of 6-van) are cut-away. A part of the bow 230 installed in the horizontal direction of the vehicle body is deleted.

The bow 230 is longitudinally installed in the ceiling part of the conventional vehicle body in the horizontal direction for preventing torsion of the vehicle body. As shown in FIG. 4, two bows 230 are removed. When the bows 230 are removed, a protector 240 is installed in the portion in which the bow 230 is removed in the roof side rail part 210c covered by the high roof 100, namely, in the empty portion of the bow of the roof side rail part 210c.

Figure 5:
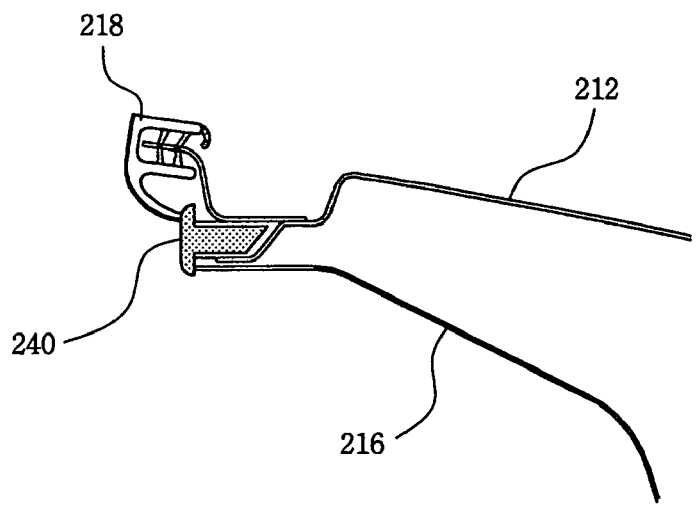
FIG. 5 is a cross sectional view taken from a bow surface of a side rail part according to an embodiment of the present invention.

FIG. 5 is a cross sectional view taken from the portion of the bow of the side rail part. Reference numeral 240 represents a protector. The empty portion of the removed bow 230 in the lower portion of the weather strip 218 is filled using the EPDM rubber.

Figure 6:
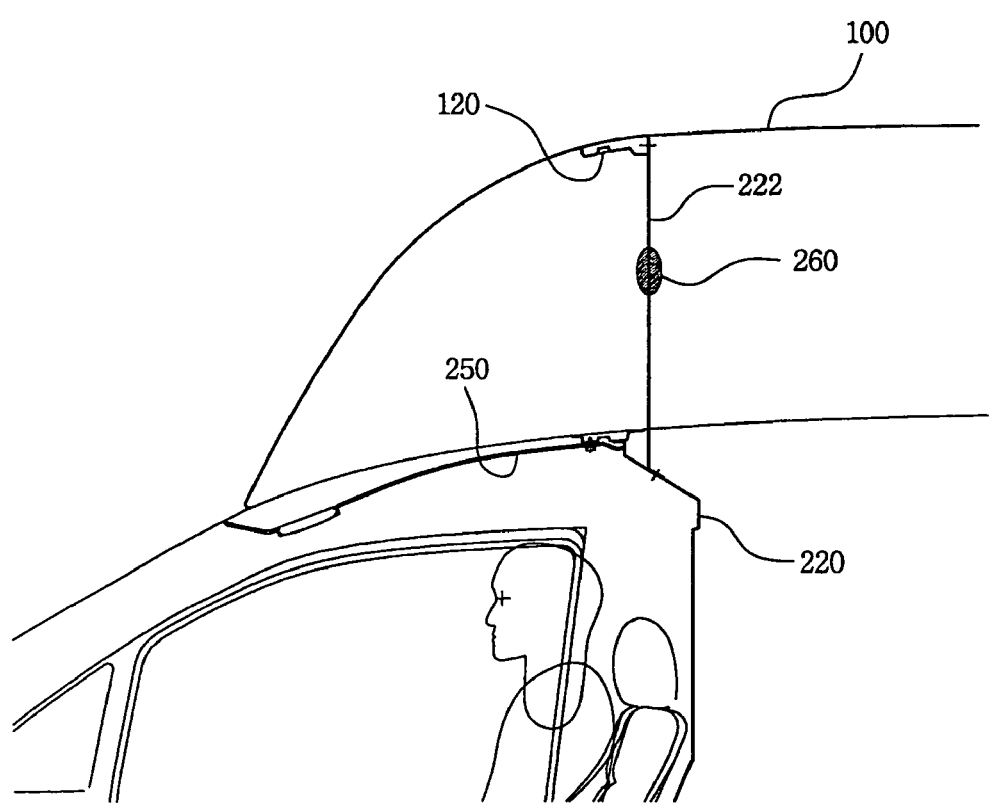
FIG. 6 is a cross sectional view illustrating a room lamp of a center panel of a partition installation portion of a vehicle with a high roof installed according to an embodiment of the present invention.

FIG. 6 is a view illustrating a partition installation panel of a passenger seat and a freight compartment in the high roof of the present invention and illustrating an installation position of the room lamp. In the drawings, reference numeral 100 represents a high roof, and reference numeral 250 represents a conventional head lining.

In the drawing, reference numeral 260 represents a position that the room lamp is installed in the high roof structure according to the present invention. As shown therein, in the high roof structure of the present invention, the room lamp is installed in the extension panel 222 installed in the upper and lower sides. An upper end of the extension panel 222 is engaged to a back surface of the bow 120 installed in the horizontal direction on an inner surface of the high roof 100, and the lower end of the extension panel 222 is fixed to the back surface of the vehicle body partition panel 220 adapted to partition the driver's seat.

In the high roof structure for a vehicle according to the present invention, the high roof is made of a FRP material having a good durability and a good forming property. The high roof with a reinforcing structure is integrally formed with the vehicle body using a predetermined adhering member and an engaging member, not using a welding method. Therefore, it is possible to increase an indoor height of the vehicle.

What is claimed is:

1. A high roof structure of a vehicle comprising:
   a high roof formed in a container shape using a FRP (Fiber Reinforced Plastics) and being provided with a reinforcing structure, wherein said high roof covers a cut-away portion of a ceiling portion of a vehicle body; and
   a flange part bent inwardly from the roof on the entire portions of a front part, a rear part and a side part of the high roof, wherein said flange part is engaged with each roof rail part of the vehicle body by an adhering means and an engaging means, wherein said reinforcing structure is fabricated in such a manner that a plurality of reinforcing members, each having a channel-shaped cross section, are longitudinally spaced in an inner surface of the high roof in a longitudinal direction and a lateral direction, respectively.

2. A high roof structure of a vehicle according to claim 1, wherein said front part and rear part of the high roof are engaged with the vehicle body using an engaging means including a bolt passing through the flange part, outer panel of a vehicle body and a roof rail and a nut engaged to the bolt in a state that an adhering means is coated between the flange part bent inwardly and outer panel of the vehicle body of a corresponding roof rail part.

3. A high roof structure of a vehicle according to claim 1, wherein said side part of the high roof comprises:
   an inner side flange part formed in such a manner that the flange part is bent inwardly from the roof, wherein said inner side flange part is engaged to an upper surface of a side outer panel of the roof side rail part; and
   an outer side flange part engaged with the side outer panel.

4. A high roof structure of a vehicle according to claim 3, wherein said inner side flange part is engaged with the vehicle body by an engaging means including a bolt passing through the inner side flange part, a side outer panel and a side inner panel and a nut engaged with the bolt in a state that an adhering means is coated between an upper surface of the side outer panel.

5. A high roof structure of a vehicle according to claim 4, wherein said engaging means further comprises a reinforcing plate between the nut and an upper surface of the side outer panel, wherein said reinforcing plate has a lateral surface closely contacting with an inner surface of the roof, and a form part formed based on a bolt engaging angle at the nut engaging portion.

6. A high roof structure of a vehicle according to claim 3, wherein said outer flange part is compressed in a state that an adhering means is coated between the side outer panels, wherein a sealant is coated on the entire surrounding portions of the side part between the lower end of the outer side flange part and the side outer panel.

7. A high roof structure of a vehicle according to claim 1, wherein a weather strip is engaged on the entire surrounding portions in the roof rear rail part of the vehicle body covered by the high roof and an inner end portion of the side rail part.

8. A high roof structure of a vehicle according to claim 1, wherein a protector is inserted into a portion of a bow that is removed from the roof side rail part covered by the high roof.

* * * * *